Patented Feb. 1, 1944

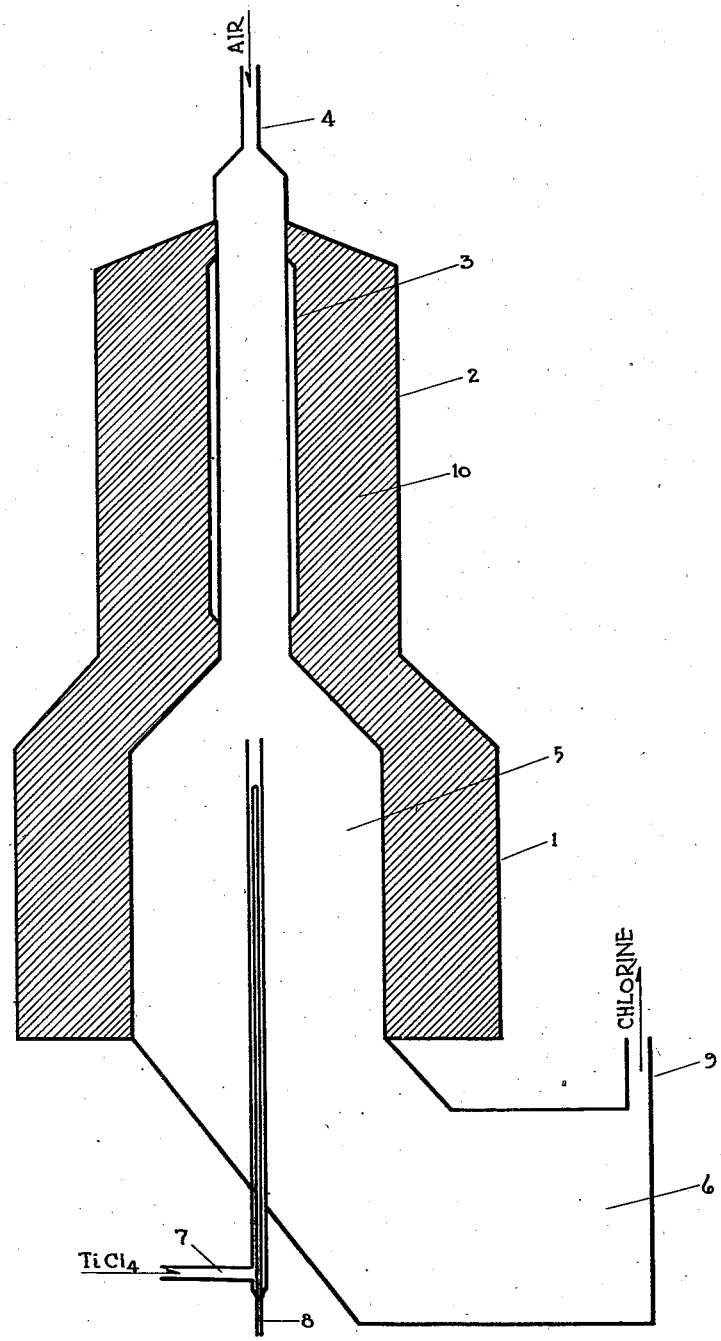

2,340,610

UNITED STATES PATENT OFFICE 2,340,610

PREPARATION OF TITANIUM DIOXIDE

Irving E. Muskat, Akron, and Alphonse Pechukas, Barberton, Ohio, assignors to Pittsburgh Plate Glass Company, Allegheny County, Pa., a corporation of Pennsylvania Application May 4, 1939, Serial No. 271,694

2 Claims. (Cl. 23—202)

This invention relates to the preparation of metallic oxides such as titanium dioxide by thermal decomposition of titanium tetrachloride in the presence of oxidizing gases. Prior to the present invention, numerous attempts have been made to devise a process of thermally decomposing this compound. In general, the product obtained in such cases was found to be coarse, crystalline, and unsuitable for use as a pigment. In a prior application of Irving E. Muskat, Serial No. 176,647, filed November 26, 1937, now U. S. Patent No. 2,240,343, a process was described for preventing the formation of crystals. It was noted in that application that crystal formation could be prevented by preventing decomposition of titanium tetrachloride adjacent hot surfaces. This may be done by preventing contact of the titanium tetrachloride with hot surfaces and/or preventing accumulation of oxygen adjacent such surfaces whereby decomposition is prevented or substantially minimized.

In accordance with the present invention we have provided novel methods for thermally decomposing titanium tetrachloride and for minimizing crystal formation. We have found that crystal formation may be substantially minimized by maintaining an atmosphere of a suitable gas such as chlorine which is capable of preventing the oxidation of the tetrachloride adjacent the point at which it is introduced into the reaction chamber. The presence of a chlorine atmosphere in this area not only minimizes the accumulation of oxygen adjacent the inlet for titanium tetrachloride but also tends to rechlorinate any titanium dioxide which may be inadvertently formed at this point. Thus, the tendency for the growth of buds, or crystals of titanium dioxide on the inlet nozzle is prevented. In addition, when chlorine is used as the protective medium, there will be no dilution of the chlorine formed during the reaction as would be the case where inert gases are employed.

Various methods of introducing the chlorine into the reaction chamber may be used. Thus, titanium tetrachloride vapor may be introduced through a nozzle or tube which is placed concentrically within a second larger tube or nozzle through which chlorine is allowed to flow. In such a case a stream of chlorine may flow continuously or intermittently past the tetrachloride inlet thus sweeping the titanium tetrachloride away from the inlet and into the reaction zone where it is decomposed. In addition, the titanium tetrachloride may be introduced by establishing a chlorine atmosphere in a portion of the furnace and spraying or showering drops of titanium tetrachloride through this atmosphere into the oxidizing zone within the furnace. In any case, the accumulation of a reacting concentration of oxygen immediately adjacent the tetrachloride inlet may be prevented.

In accordance with a further modification, it is found convenient to use the chlorine resulting from the decomposition of the titanium tetrachloride for the establishment of the inert atmosphere. This may be done in suitable manner by constructing the apparatus so that chlorine evolved during the reaction is swept back over the surface of the titanium tetrachloride inlet. For example, we have been able to provide a suitable device wherein air or oxygen and titanium tetrachloride are introduced into the reaction zone in opposed directions and the chlorine produced is withdrawn along the exterior of the titanium tetrachloride inlet. This phase of the invention may be fully understood by reference to the accompanying drawing which is a diagrammatic sectional view of an apparatus which may be used in accordance with this invention.

In this embodiment we may use a vertical cylindrical furnace 1, which may be provided with a reaction chamber 5, and a preheating chamber 2. The preheating chamber is provided with suitable heating elements 3, and if desired, the reaction chamber may also be heated in this manner with elements not shown. The furnace may be covered with suitable insulation 10, and is constructed to communicate with a separating chamber 6, in which titanium dioxide may be removed from the reaction gases. The furnace is also provided with titanium tetrachloride inlet 7, which may be heated by heating element 8.

In the operation of the device, air, oxygen or other oxidizing gas is introduced in a downwardly directed stream into the upper portion of the furnace at 4, and is preheated in preheater 2, by means of heating element 3. At the same time titanium tetrachloride, with or without a suitable diluent such as nitrogen, chlorine or carbon dioxide, is introduced into tube 7, and is heated by element 8, as it passes upwardly into the furnace. The tetrachloride is decomposed to form titanium dioxide and chlorine when it contacts the hot stream of oxygen. The chlorine and suspended titanium dioxide are then withdrawn along the exposed portions of inlet tube 7, and after removal of the solid titanium dioxide, chlorine is withdrawn at outlet 9. The flow rates of oxygen and titanium tetrachloride are adjusted so that substantially all of the oxygen is reacted and no substantial quantity of gaseous oxygen remains in the chlorine gas which is withdrawn along the exterior of the titanium tetrachloride inlet. Ordinarily the process is regulated to introduce oxygen and titanium tetrachloride in the stoichiometric amounts required for production of titanium dioxide. However, small excesses of the order of 5 to 10 percent of either material are found to be unobjectionable.

If desired, the process may be conducted using a substantial excess of titanium tetrachloride. In such a case the atmosphere about the inlet may contain titanium tetrachloride but will not thermally decompose at that point to an appreciable degree due to the substantial absence of oxygen.

It will be apparent that by proper regulation of the size of the chamber and of the rates of introduction of oxygen and titanium tetrachloride and of withdrawal of evolved chlorine it is possible to conduct the process in a manner such that oxygen and titanium tetrachloride do not accumulate in reacting concentrations adjacent the hot walls of the chamber. Consequently, decomposition of the tetrachloride adjacent the hot surfaces with undesirable crystal formation is avoided. The prevention of the crystal formation may be facilitated by introducing the titanium tetrachloride at high speeds whereby it is removed from the inlet before decomposition can occur. Crystal formation adjacent the walls of the decomposition chamber may be prevented by maintaining a nonreactive body of gas adjacent such walls. Thus, chlorine, nitrogen, titanium tetrachloride or mixtures of chlorine, nitrogen and/or titanium tetrachloride may be maintained about the walls by any convenient method. If desired, portions of the exhaust chlorine may be withdrawn adjacent the walls or a stream of inert gas may be caused to flow along the walls. Similarly, an inert gas may be maintained in a quiescent state adjacent the walls by use of a chamber of proper size and construction whereby oxygen is not introduced and does not accumulate near the walls.

While the temperature at which thermal decomposition of titanium tetrachloride is to be secured may be varied considerably, it is generally found that maximum yields of pigmentary materials may be secured at temperatures of 1500 to 2000° F. or above. Lower temperatures may be used but tend to result in lower yields of pigment. The titanium dioxide produced by this process is usually in the form of a fine powder or dust.

The following examples are illustrative.

Example I

Using an apparatus having the general structure as shown in the accompanying drawing, air was introduced into a reaction zone having an internal diameter of 14 inches at the rate of 180 l. per minute and titanium tetrachloride countercurrently introduced through a tube having an internal diameter of 5/8 inch at a rate of 33.6 l. per minute. The temperature was maintained at 1800° F. throughout the reaction and the reaction products containing chlorine gas were withdrawn along the exterior of the titanium inlet tube and conducted to the settling chamber where suspended titanium dioxide was recovered. The process was continuously operated for a period of 5¼ hours and a yield of 96 percent of pigmentary titanium dioxide was obtained. The amount of crystals formed was negligible.

Example II

The process described in Example I was repeated using a reaction zone having an internal diameter of 4 in. through which air was introduced at a rate of 28 l. per minute. The titanium tetrachloride was introduced through a tube having a diameter of 0.5 inch at a rate of 30 grams per minute. The temperature was maintained at 1800° F. through the duration of the reaction. The product was very fine and possessed a good color. The amount of coarse crystals formed was below 0.5 percent of the total $TiO_2$ formed.

In order to insure substantially complete absence of oxygen adjacent hot surfaces and thus prevent decomposition at these points, it is often desirable to maintain a quantity of carbon adjacent such surfaces. Thus, coatings of carbon may be applied to the exterior of the titanium tetrachloride nozzle and/or or the walls of the furnace. Similarly, all or a portion of the exposed walls and/or nozzle may be constructed of carbon or other agent capable of reacting with oxygen, such as nonvolatile halides, for example, magnesium or calcium chloride.

Although the present invention has been described with reference to the specific details of certain embodiments thereof, it is not intended that such details shall be regarded as limitations upon the scope of the invention except insofar as included in the accompanying claims.

We claim:

1. In a method of preparing titanium dioxide by reacting titanium tetrachloride in vapor form with oxygen, the improvement which comprises introducing titanium tetrachloride vapors and a gas containing free oxygen into a reaction zone in substantially opposite directions and withdrawing the reaction products from the reaction zone in such direction and at such a rate that the evolved chlorine therein is carried by and surrounds the point of introduction of titanium tetrachloride; the tetrachloride vapors and oxygen being introduced in such relative amounts and under such conditions of temperature and flow as to avoid any substantial concentration of free oxygen in the evolved chlorine at the point of introduction of titanium tetrachloride whereby formation of titanium dioxide adjacent thereto is prevented.

2. In a method of preparing titanium dioxide by reacting titanium tetrachloride in vapor form with oxygen, the improvement which comprises introducing titanium tetrachloride vapors and oxygen into a reaction zone in substantially opposite directions and withdrawing the reaction products from the reaction zone in such direction and at such a rate that the evolved chlorine therein is carried by and surrounds the point of introduction of titanium tetrachloride; the tetrachloride vapors and oxygen being introduced in such relative amounts and under such conditions of temperature and flow as to avoid any substantial concentration of free oxygen in the evolved chlorine at the point of introduction of titanium tetrachloride whereby formation of titanium dioxide adjacent thereto is prevented.

IRVING E. MUSKAT.
ALPHONSE PECHUKAS.